United States Patent [19]
Cardinal et al.

[11] Patent Number: 5,799,318
[45] Date of Patent: Aug. 25, 1998

[54] METHOD AND APPARATUS FOR COLLECTING AND DISPLAYING INFORMATION FROM DIVERSE COMPUTER RESOURCES

[75] Inventors: David J. Cardinal, Portola Valley; Rod G. March, Palo Alto, both of Calif.

[73] Assignee: FirstFloor Software, Mountain View, Calif.

[21] Appl. No.: 689,405

[22] Filed: Aug. 8, 1996

Related U.S. Application Data

[63] Continuation of Ser. No. 46,582, Apr. 13, 1993, abandoned.
[51] Int. Cl.$^6$ ....................................................... G06F 17/30
[52] U.S. Cl. .......................... 707/104; 707/200; 707/203; 395/200.33
[58] Field of Search ................................... 395/701–703, 395/712, 601, 610, 614, 615, 616, 617, 619, 200.3, 200.31, 200.32, 200.33, 200.34, 200.35, 200.78, 839; 707/10, 104, 200, 201, 203, 511

[56] References Cited

U.S. PATENT DOCUMENTS

| | | | |
|---|---|---|---|
| 5,008,853 | 4/1991 | Bly et al. | 395/153 |
| 5,133,025 | 7/1992 | Risch | 395/600 |
| 5,220,657 | 6/1993 | Bly et al. | 395/425 |
| 5,315,703 | 5/1994 | Matheny et al. | 395/164 |
| 5,329,619 | 7/1994 | Page et al. | 395/200.33 |
| 5,423,043 | 6/1995 | Fitzpatrick et al. | 395/683 |
| 5,471,629 | 11/1995 | Risch | 395/600 |
| 5,592,664 | 1/1997 | Starkey | 395/601 |
| 5,594,910 | 1/1997 | Filepp et al. | 395/800.28 |
| 5,649,105 | 7/1997 | Aldred et al. | 395/200.05 |

FOREIGN PATENT DOCUMENTS

| | | | |
|---|---|---|---|
| 061330A2 | 5/1995 | European Pat. Off. | G06F 9/46 |

OTHER PUBLICATIONS

Richard Karpinski, "SmartMarks Technology a pet project for First Floor CEO," Interactive Age, Aug. 21, 1995, two pages.

Stewart Alsop, "Bookmarks mark the next chapter in the continuing story of the War of the Web," InfoWorld, Sep. 11, 1995, two pages.

"Smart Files: The radically simple way to share Internet and workgroup documents," First Floor, Inc., Mountain View California, 1995, two pages.

"Smart Bookmarks, The radically simple way to stay on top of the web," First Floor, Inc., Mountain View, California, 1995, two pages.

"Internet Marketing with Bulletins," First Floor, Inc., Mountain View, California, four pages (date unknown).

"First Floor Software Corporate Backgrounder," First Floor Software, Mountain View, California, (date unknown).

Netscape Press Releases, "Netscape Introduces Netscape SmartMarks and Netscape Chat—Applications Bring New Navigation and Communications Capabilities to Users of Netscape Navigator for Windows," Aug. 22, 1995, two pages.

Robert Hertzberg, "Agent–Aided Bookmarking for Win95 Browsers," Web Week (@ http://www.iworld.com/ww–online/), Jan., 1996, p. 33.

Jessica Davis, "First Floor Tools monitor Web site changes," InfoWorld, Feb. 19, 1996, p. 51.

NetMind, "@ a Glance," @ http://www.netmind.com/html/company–info.html, date unknown.

(List continued on next page.)

Primary Examiner—Paul V. Kulik
Attorney, Agent, or Firm—Blakely, Sokoloff, Taylor & Zafman LLP

[57] ABSTRACT

A method and apparatus is disclosed for organizing and reviewing information from diverse computer applications. An item, describing the information and referring to an attached file, is formed for each piece of information. In turn, each item is grouped into a selected view for a particular user. An external file or object, corresponding to an item, is accessible from the present invention. Changes or additions in information, within an item such as an external file or object as well as a view, are determined and indicated with respect to each user.

48 Claims, 11 Drawing Sheets

OTHER PUBLICATIONS

Thomas Ball et al., "An Internet Difference Engine and its Applications," Proceedings of COMPCON '96, Technologies for the Information Superhighway, 41st IEEE Computer Society International Conference, IEEE Computer Society Press, pp. 71–76, Feb. 1996.

"The CGI Specification," @ http://hoohoo.ncsa.uiuc.edu/cgi/interface.html, twenty pages, date unknown.

OmniWeb's "Bookmarks," pp. 1–5 (date unknown), at http://www.omnigroup.com/Software/OmniWeb/2.0/Docs/bookmarks.html.

OmniWeb's "Changing OmniWeb's Default Behavior," pp. 1–7 (date unknown), at http://www.omnigroup.com/Software/OmniWeb/2.0/Docs/preferences.html.

Oscar Diaz et al., "Rule Management in Object Oriented Databases: A Uniform Approach," Proceedings of the 17th Int'l Con'f on Very Large Databases, Sept. 1991, pp. 317–326.

Tore Risch, "Monitoring Database Objects," Proceedings of 15th Int'l Con'f on Very Large Databases, 1989, pp. 445–453.

Groupware, Computer Support For Business Teams, Robert Johansen, 1988.

Digital's Office Strategy, "An Open Architecture" Judith R. Davis, Nov. 89.

"Groupware '92", David Coleman, et al., 1992.

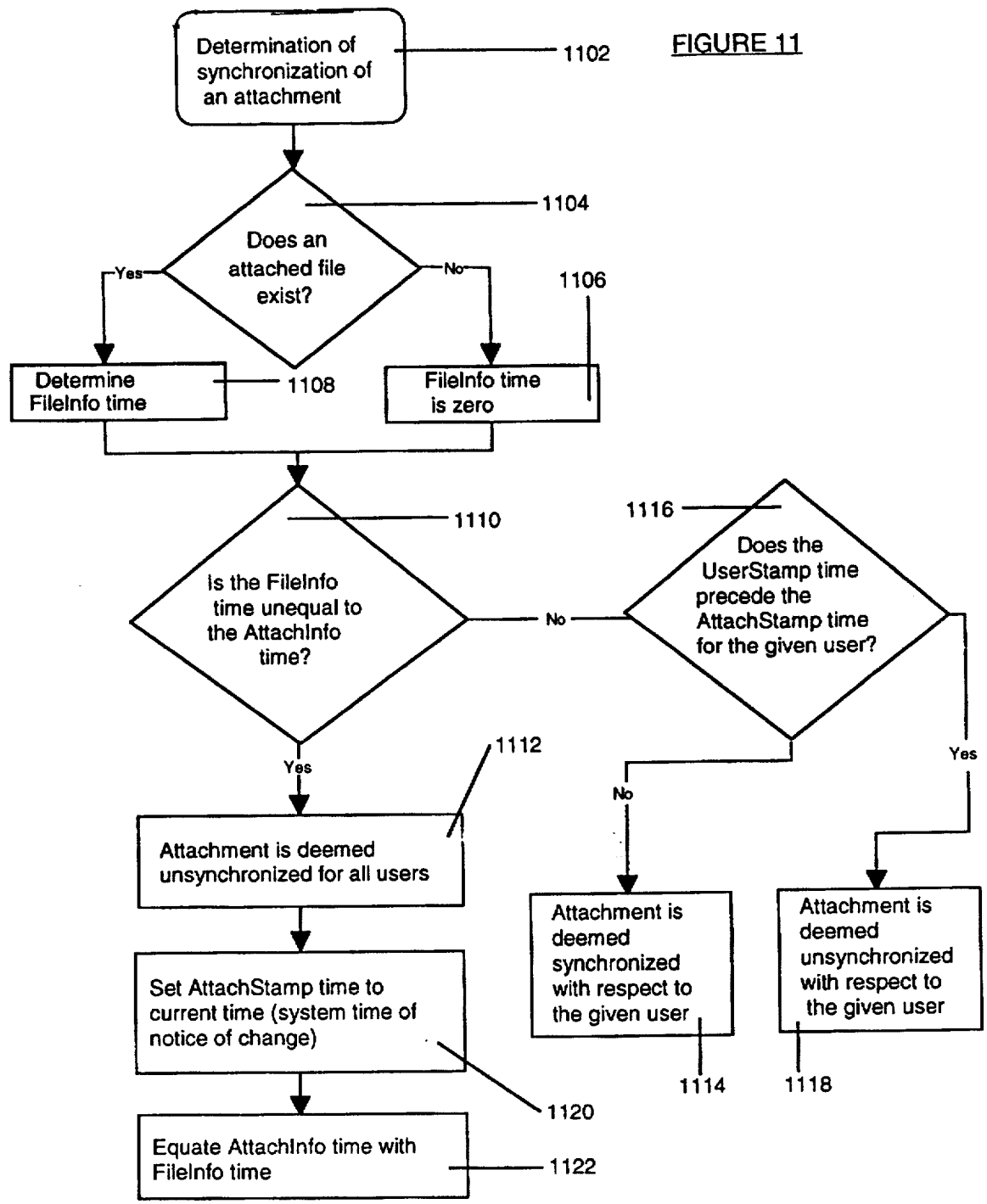

METHOD AND APPARATUS FOR COLLECTING AND DISPLAYING INFORMATION FROM DIVERSE COMPUTER RESOURCES

This is a continuation of application Ser. No. 08/046,582, filed Apr. 13, 1993, now abandoned.

FIELD OF THE INVENTION

This invention generally relates to the organization of information for user review, and more particularly, to the management of information in a networked computer environment.

BACKGROUND OF THE INVENTION

Various applications are currently employed to undertake the management and distribution of information. Typically, these applications segment information into specific categories as defined by the type of information or the application. Existing applications fall into the broad categories of transaction based applications and file based applications.

Electronic mail ("e-mail") applications, such as the "cc:Mail" product of Lotus Development and the "Mail" product of Microsoft, are typical examples of transaction based applications. Electronic mail applications provide for the electronic exchange of information between workstations. A further typical transaction based application is a "bulletin board system" such as Lotus Development's Notes or Mustang Software's Wildcat. Such systems are employed for discussions and electronic conferences.

Typical file based applications include file manager tools and document management systems. File manager tools, such as the Windows™ product of Microsoft, are employed to search and group document files by context. Similarly, document management systems, such as SoftSolutions™, are utilized for annotating and organizing document files by criteria in addition to context.

Transaction based applications operate to save each new message as a transaction. Other users may comment on a new message by forming an additional message. The additional message, even if affixed to the original message, becomes a new transaction whereby it is added to a list of individual messages. Transactions can be added and deleted, but, they are not dynamic. That is, transactions cannot be changed over time as the information changes. Thus, a message which contains information that is subsequently changed requires that a new message be sent to indicate changed information. Hence, transaction based applications present work group environments with significant limitations.

By contrast, file based applications are used to organize and annotate files in the network systems that contain document files. As the contents of and annotations of a document file are modified by a user, other users are not notified of the modifications. Thus, a user reviewing the document file can only find the date of the alteration and the latest version of the file or annotation.

Both transaction based applications and file based applications are accessed and managed separately. This is so even though each may pertain to the same matter. Hence, a user must mentally integrate the assorted information found within the two types of applications in order to accurately ascertain the status of any matter.

Attempts have been made to formulate systems which integrate information from transaction based and file based applications. Such attempts require that certain provisions be employed for managing the diverse types of information. In particular, information from file based applications is managed with intermittent provisions for properties and descriptions. Information from transaction based applications is managed with limited provisions for files. The provision for files is normally limited in one of two manners. First, a file may be required to be "imported" into the system. This causes the file to be incapable of being utilized by other users. Furthermore, the importation typically necessitates a complete reorganization of existing documents within the system. Second, a file may be loosely attached to the system. Such an attachment results in an inability to notify users of modifications that have been made to the file.

In sum, current computer applications fail to provide a means by which information gathered from transaction based applications and file based applications are integrated together. The result is that a network user is required to undertake a lengthy process, usually involving the inspection of the contents of a number of computer applications, in order to ascertain the status of a particular subject matter. A typical network user is usually unable to invest a substantial amount of time to inspect a series of diverse applications. Thus, the prior art that applicant is aware of does not provide a method for integrating, for the purposes of organization and review, the contents of diverse applications for user review.

Consequently, there exists an unfulfilled need for a system wherein information contained within transaction based applications and file based applications is organized and shared between network users. Furthermore, there exists an unfulfilled need for a system which indicates the existence of new or modified information with respect to each user of a network.

SUMMARY OF THE INVENTION

The present invention overcomes the aforementioned deficiencies of the prior art by providing a method and apparatus for organizing information through the formation and execution of a specified organizational system.

A unique system for integrating a collection of information, received from diverse computer applications, is provided for ascertaining the status of a particular matter. The system further provides for access to each piece of information which pertains to a particular matter, it being irrelevant from which application the piece of information derives.

During examination of a particular matter, it is typically desirable to review the various pieces of information which concern the matter. It is also desirable to view any modified or added pieces of information. The present invention provides such capabilities by creating an item for each piece of information as well as creating a corresponding description which explains the piece of information. Each created item is thereafter topically organized by placement within one or more views. Organizing the created items within an object oriented environment will thus allow for the review and access of a desired piece of information based upon the descriptions of the information. Moreover, the present invention indicates modified and added information to assist the user in reviewing previously unread information.

BRIEF DESCRIPTION OF THE DRAWINGS

The foregoing and other objects, aspects and advantages of the present invention will be better understood from the following detailed description of the preferred embodiment of the invention with reference to the accompanying drawings, in which:

FIG. 11 illustrates a flow chart depicting the procedure for determining whether non-synchronized subject matter is contained within an attachment in accordance with the present invention.

DETAILED DESCRIPTION OF THE INVENTION

Computer System

Figure 1:
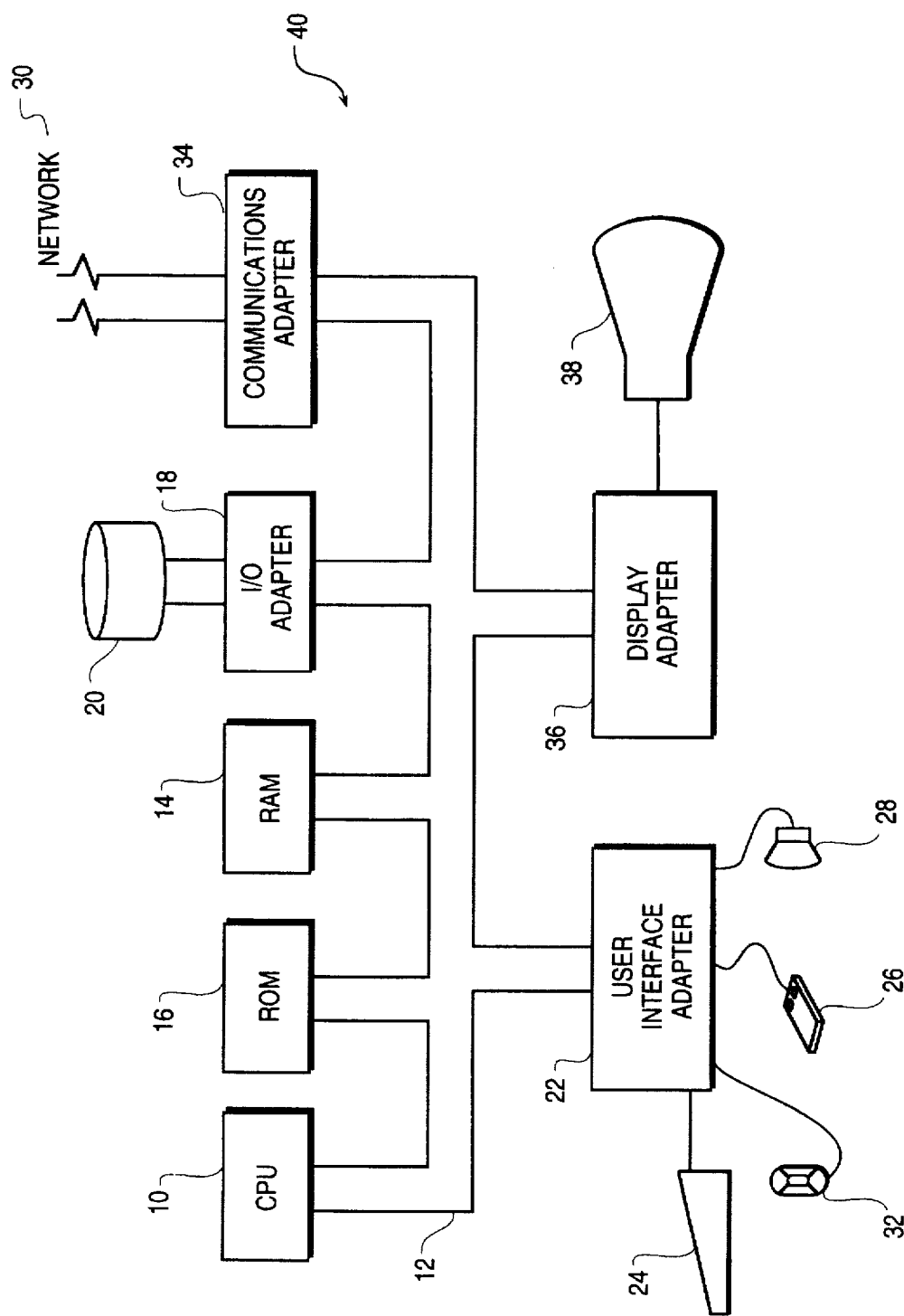
FIG. 1 is a block diagram of a computer system in accordance with the present invention.

A representative hardware environment is depicted in FIG. 1, which illustrates a suitable hardware configuration of a workstation 40 to be employed in accordance with the present invention. The workstation 40 has a central processing unit 10, such as a conventional microprocessor, and a number of other units interconnected via a system bus 12. The illustrated workstation 40 shown in FIG. 1 includes a Random Access Memory 14 (RAM), a Read Only Memory 16 (ROM), an I/O adapter 18 for connecting peripheral devices such as disk units to the bus 12, a user interface adapter 22 for connecting a keyboard 24, a mouse 26, a speaker 28, a microphone 32, and/or other user interface devices such as a touch screen device (not shown) to the bus 12. The workstation 40 may also have a communications adapter 34 for connecting the workstation, 40 to a data processing network 30 and a display adapter 36 for connecting the bus 12 to a display device 38.

Operation of Flexible System

The present invention provides for the simultaneous management of diverse types of information on a workstation. Such management is provided regardless of the type of application generating or storing the information.

The present invention allows for distinct matters to be categorized within formulated data objects. Each data object represents a unique hybrid of information, and is associated with one or more boards. A board comprises a listing of items which pertain to a set of data objects. An item consists of an individual piece of data such as a document file or an electronic mail message. A folder of related items can also be formed within a board. This is referred to as a sub-view.

Each user selectively places items, contained within a given board, into one or more different personal views based upon a subjective organization. An item may, however, be placed in more than one view. Accordingly, each user tailors a personal view to include a related set of items. While a user freely forms personal views, the present invention provides a "root view" which contains all of the items within a given board. Accordingly, the root view initially displays all top-level items and sub-views within the given board.

Each item may possess an attached document file referred to as an attachment. The contents of the document file are not stored within the present invention. Rather, the attachment is maintained external to the present invention within its natural environment. For instance, the attachment can be maintained in an external data base, or in a file system resident on a local machine or server. The present invention provides, however, for diverse operations to be carried out upon the attachment. Such operations include: the accessing of the attachment, the maintenance of information concerning modifications to the attachment, and the maintenance of a long name, description and user notes for the attachment.

A user commences a session with a board by providing either a new credential, a preset credential, or a pre-established credential. Each credential includes a user name between one and eight characters and a user password. The credential forwarded by the user is the name which the present invention will use when referring to the user who provided the credential. User commencement or "log-in" is not critical to the present invention. A user commencement does, however, establish the existence of a particular user session which is important for multi-user item synchronization.

The user credentials are thereafter authenticated by comparing the user name and user password with existing users and passwords within a formulated commencement directory. In the event that the provided credentials correspond with those within the commencement directory, the user is permitted to commence a session. If the forwarded user name corresponds with an existing user while the user password does not, then commencement is disallowed and the user must attempt commencement again or exit the system.

After appropriate credentials have been provided by a user, the present invention solicits the board which the user desires to observe. Upon selection of a desired board, the user may opt to cause the provided user name, user password, and board to each be saved for subsequent use. This need only be undertaken when either the user name, user password or desired board has been modified from the previous sessions. Thereafter, the selected board is displayed.

Figure 2:
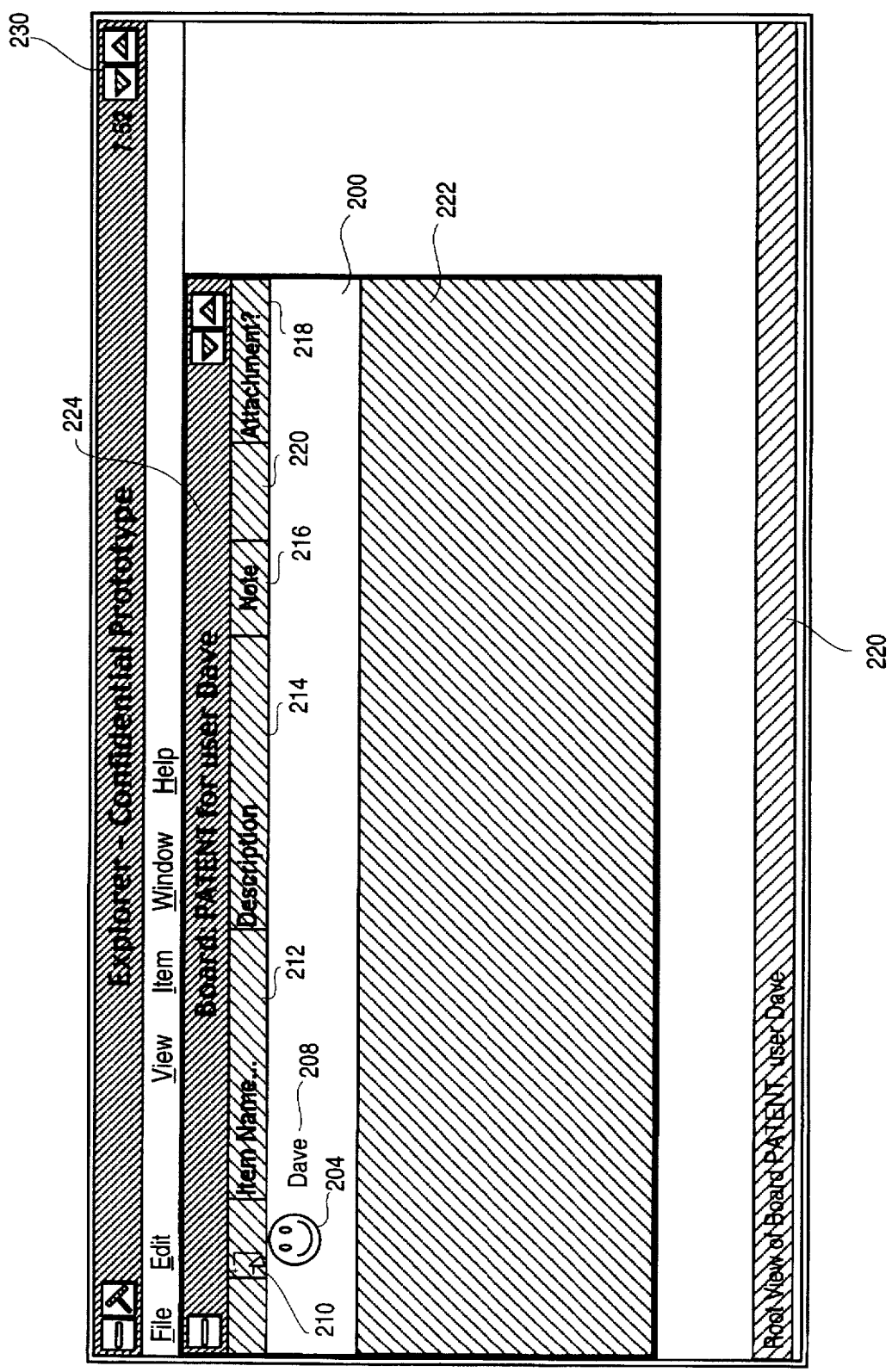
FIG. 2 illustrates a root view of a board upon commencement of a user session in accordance with the present invention.

Referring to FIG. 2, a displayed board is illustrated after an initial user invocation of the system and selection of a board. Upon commencement of the system, the selected board is displayed within its "root view". The root view is the initial view within a session. It allows for access to all items and other views within a board. Typically, a user has only one root view since only one board exists. However, a user may create multiple boards or may even access the root view of another user subject to appropriate permissions.

Personal views may be created by a user in three ways. First, since views are often collections of related documents, underlying networks may be searched for files having user specified criteria. Possible search bases include wildcard searches, location based matching, content based and keyboard based retrieval methods, and retrieval based upon permissions, ownership, dates and unique attributes. Second, a view may be created by transforming an existing item into a view through a designated command. Third, a view may be created from a search of the items in one or more boards which meet a specific criteria or set of criteria, as designated by the user.

Before the root view of a board is initially displayed, the board searches for top-level views, items, and other user objects which the user has access to, for display to the user.

The root view of a board entitled "PATENT" is illustrated within window 222 of FIG. 2. Window 222 is identified by the title "Board:PATENT for user Dave" as indicated by reference numeral 224. This board is denoted by footer 220 of system window 230. Footer 220 also denotes that the user who has initiated the system is named Dave.

As the items of the root view are displayed, the present invention determines which of the items contain unread information. Displayed items which are determined to contain unread information are marked with the notation of "NEW" on the display interface. Items contained within sub-views are also marked with the notation of "NEW" to denote an unread item within the sub-view. Additionally, the view possessing an item or sub-view having a "NEW" notation is also appropriately denoted to contain unread information. Preferably, appropriate sections of the display are color-coded or otherwise highlighted for user convenience.

The present invention then displays all of the currently accessible views to the user depending upon: (i) the parameters saved with the view; (ii) the parameters specified in a file having the suffix .INI of the corresponding user board; and (iii) the user preferences currently active.

Each item within a view possesses (i) an item type icon, (ii) a item name, (iii) an item description, (iv) an item note, (v) an attachment name, and (vi) an attachment icon. The fields for these properties are indicated by reference numerals 210, 212, 214, 216, 218 and 220, respectively. After initiation by user Dave and selection of the root view of the board entitled "PATENT," item 202 is displayed upon the system interface. Within item 202 exists item type icon 204 which denotes that item 202 represents selection of the PATENT board by user Dave. Further, item 202 is referred to by the item name "Dave" as indicated by reference numeral 208. Since item 202 simply denotes commencement of a user session, a description, note or attachment are non-existent.

Figure 3:
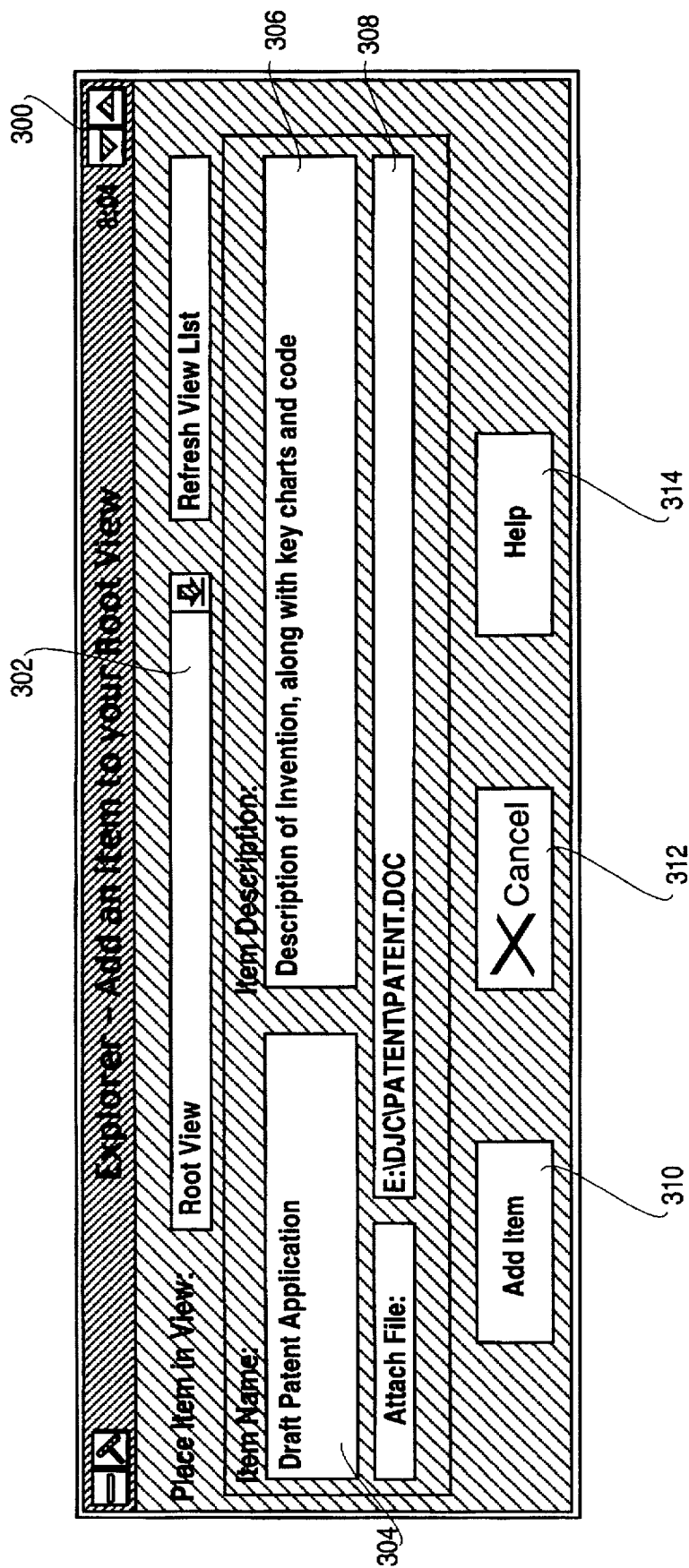
FIG. 3 illustrates an addition of an item to a root view of a board in accordance with the present invention.

An item may be created within a view by selection of the "Add Item" menu option and providing necessary information within the resulting dialog box. Referring to FIG. 3, the dialog box used for addition of an item is illustrated. Dialog box 300 comprises text boxes 302, 304, 306 and 308 for a view name, item name, item description and attached file, respectively.

A user must select what view the newly formed item will be placed within. The present invention provides the current view as a default selection. Thus, a user need only select another view when it is other than the current view. A user can insert a view name within text box 302 by one of two manners. First, text box 302 can be filled with a view name selected from a listing that is provided by dragging box 318 with a mouse pointer. Second, a view name can be keyed within text box 302.

Text box 304 can be filled in within an item name of up to 64 characters long. It can consist of any desired combination of characters and spaces. The item name allows for meaningful names to be used. Thus, the item name is not limited to DOS filenames. For instance, proper item names could include: "My expense report from my Jun. 23rd trip"; "Doug's letter to me"; and "Sep. 9, 1992 visit to Select Corp."

The item description placed within text box 306 can be up to 255 characters. The placed text will scroll and word-wrap automatically to accommodate more than one line. A detailed description may not, however, fit within item description text box 306. In such a case, the item can be converted into a sub-view or view so that it can contain multiple related items.

A document file may be attached to an item from within dialog box 300. This is accomplished by typing the document file name directly within text box 306. Alternatively, an attachment may be appended by clicking a mouse on attach file button 316 ("Attach File") which presents an attachment dialog box to the user. Necessary information is then placed within a presented attachment dialog box.

Ultimately, dialog box 300 allows the user to either (i) add the item, (ii) cancel the addition of the item, or (iii) seek out help. In order to add the specified item button 310 ("Add Item") is selected. If, however, the addition of the specified item is sought to be canceled, button 312 ("Cancel") is selected. Moreover, if the user desires to seek out help in implementing the addition of an item, button 314 is selected.

Within dialog box 300 of FIG. 3, various user selections have been made for each text box. The view name of "Root View," which is the current view and thus default view name, is left unchanged within text box 302. Thereafter, item name and item description of the item to be placed are keyed into text box 304 and text box 306, respectively. The name of the item and the item description are "Draft Patent Application" and "Description of Invention, along with key charts and code", respectively. Further, an attached file is denoted through text box 308. Specifically, the document file entitled "E:\DJC\PATENT\PATENT.DOC" has been attached to the added item.

While dialog box 300 provides a means to attach an external document file, an external document file may be also be attached to an item by two other manners. First, an item may be attached to an existing item through a specific command within the Item menu. Selection of such command causes rendering of the attachment dialog box. Second, an external document file can be attached to an item by dragging a file representation onto the attachment area of the item. Regardless of the manner of attachment, an attached document file may also be removed. This is accomplished by first selecting the item desired to be removed and thereafter selecting the, "Remove Attachment" command under the Item menu.

Figure 4:
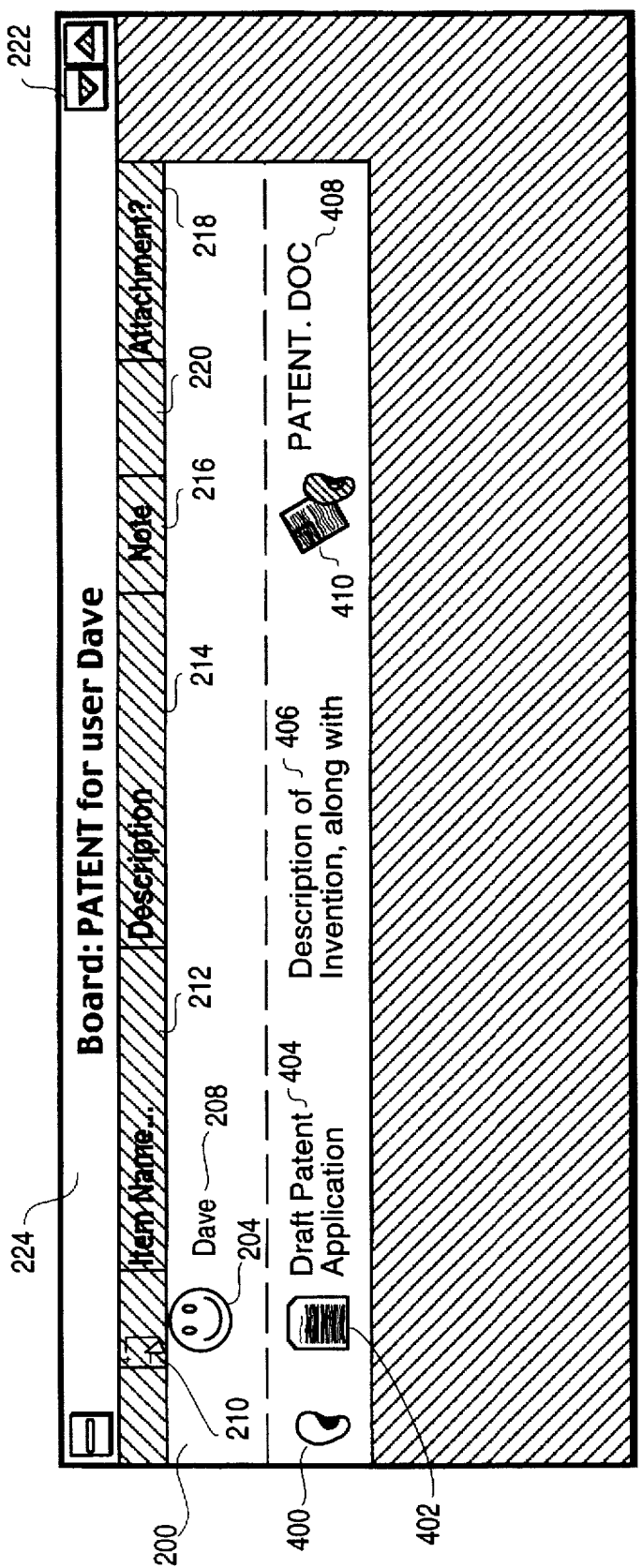
FIG. 4 illustrates a root view of a board after addition of an item in accordance with the present invention.

Referring to FIG. 4, the board display is illustrated after addition of the draft application item. Display of the PATENT board display yields the addition of item 400 to previously existing item 202. The information disclosed within window 300 is embodied within item 400. First, icon 402 symbolizes the existence of a document. Second, the document has been displayed with an item name and description of "Draft Patent Application" and "Description of Invention, along with", respectively. These are indicated by reference numerals 404 and 406, respectively. It should be noted, however, that the full description of the invention as entered in window 300 has been shortened due to the area constraints. Third, a reference to attached file "PATENT-.DOC" and an attachment icon are rendered within the PATENT board. These are indicated with reference numerals 408 and 410, respectively. User selection of the attachment icon provides access to the attached file.

Figure 5:
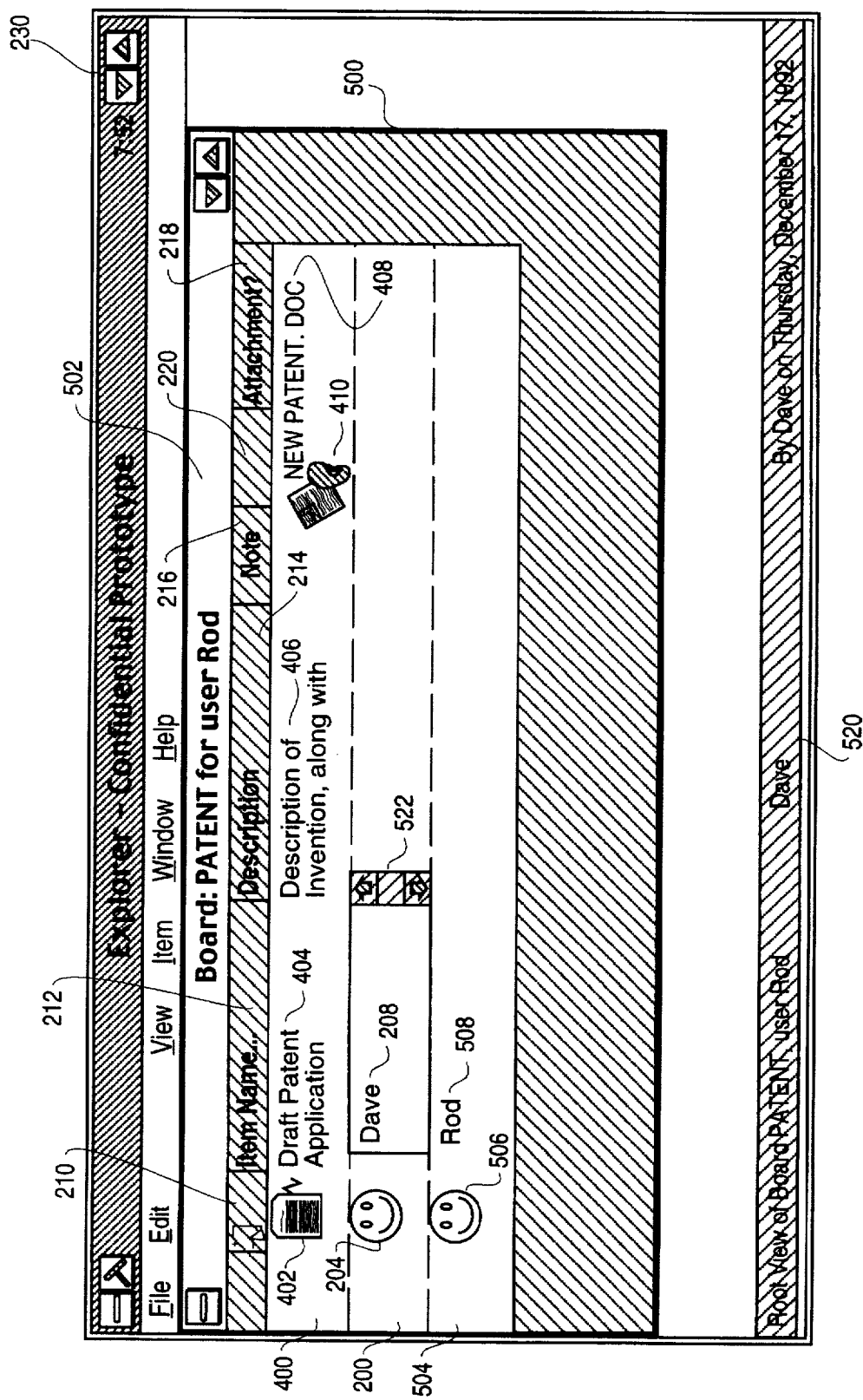
FIG. 5 illustrates a root view of a board upon commencement of a session by a second user in accordance with the present invention.

Referring to FIG. 5, a board is displayed for a second user. After user Dave has commenced a session, user Rod commences a later session and also selects the root view of the PATENT board. Accordingly, the patent board for user Rod is displayed within window 500. Window 500 is identified by the title "Board: PATENT for user Rod" as indicated by reference numeral 502. This board is denoted by footer 520 of system window 230. Footer 520 also denotes that the board is configured with respect to user Dave. Commencement of a session, by user Rod causes the system to display item 200 and item 400 to the second user. It further causes a login item to be rendered as indicated by item 504. Item 504 possesses item type icon 506 and item name 508 ("Rod"). Item 400, however, has a notation of "NEW" upon item type icon 402. This notation denotes that with respect user to Rod, item 400 has never been viewed and is therefore new information to user Rod. It should also be noted that placement of dialog box 502 over item name 208 causes footer 520 to note that Dave logged in to the system on "Thursday, Dec. 17, 1992".

Detail may be added to an item by converting it into a sub-view or view. This will allow for retention of the item name, description, note, and attachment, yet also provide the ability to collect other items. Converting an item to a sub-view or view is particularly useful when multiple versions of a document or a series of messages on a given topic are to be organized.

Figure 6:
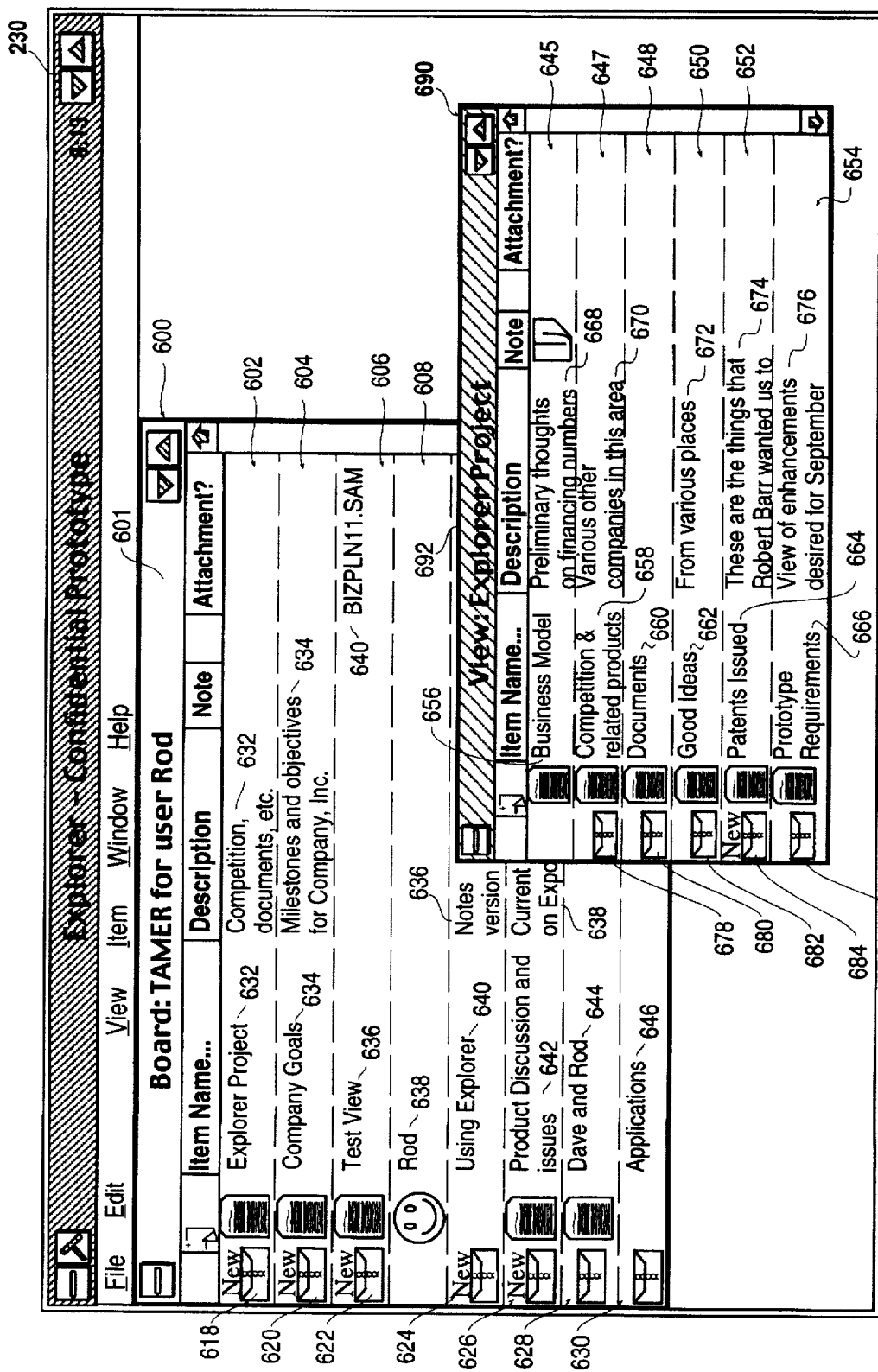
FIG. 6 illustrates a board having a number of sub-views and a window corresponding to a selected sub-view in accordance with the present invention.

Referring to FIG. 6, a different board having a number of items that represent sub-views is illustrated. FIG. 6 illustrates selection of a second board, namely, the TAMER board by user Rod. The TAMER board is displayed within window, 600 and identified by the title "Board: TAMER for user Rod" as indicated by reference numeral 601. Within the TAMER board exists a set of items. These items have the following item names: Explorer Project; "Company Goals"; "Test View"; "Rod"; "Using Explorer"; "Product Discussion and issues"; "Dave from Rod"; and "Applications". Such items are indicated by 602, 604, 606, 608, 610, 612, 614, and 616, respectively. The item names for these items are indicated by reference numerals 632, 634, 636, 638, 640, 642, 644, and 646, respectively.

Further, items 602, 604, 610, and 612 have descriptions 632 (."Competition, documents, etc."), ("Milestones & Objectives for First Floor, Inc."), 636 ("Notes . . . "), and 638 ("Current . . . "), respectively. Still further, item 606 has an attachment file entitled "BIZPLN11.SAM" as indicated by reference numeral 643. Attachment icon 641 is utilized for retrieval of attachment 643.

Sub-views and other views that are located within a view are distinguished from items by the symbol employed for the view icon. Specifically, a view icon is symbolized as a folder to indicate a sub-view or view. The view icon represented as a folder thus denotes that more information concerning the subview or view will be revealed when a mouse pointer is double clicked upon it.

Each of the items, with the exception of item 608, has a view icon represented as a folder. Thus, sub-views contained within window 600 are indicated by reference numerals 618, 620, 622, 624, 626, 628, and 630, respectively. View icons 618, 620, 622, 624, and 626 also possess a "NEW" notation to inform the current user that information exists within the item which has not been previously observed by user Rod.

Selection of a view icon for a sub-view provides a listing of the items contained within the sub-view. Thus, selection of view icon 618 yields window 690. Window 690 is identified by the title "View: Explorer Project" as indicated by reference numeral 692. Window 690 contains items 645, 647, 648, 650, 652, and 654, respectively. Such items possess item names Business Model, Competition & related products, Documents, Good Ideas, Patents Issues, and Prototype Requirements. These item names are referred to with reference numerals 656, 658, 660, 662, 664, and 666, respectively. Items 645, 647, 650, 652, and 654, have descriptions 668 ("Preliminary thoughts on financing numbers"), 670 ("Various other companies in this area"), 672 ("From various places"), 674 ("These are things that Robert Barr wanted us to do"), and 676 ("View of enhancements desired for September"), respectively.

Each of the items, with the exception of item 645, have a view icon indicating that the item represents a sub-view. Such sub-views are indicated by reference numerals 678, 680, 682, 684, and 686, respectively. View icon 684 also possess a "NEW" notation to inform the current user that information exists within item 652 which has not been previously observed by User Rod. The "NEW" notation of view icon 618 is the result of the new information found in item 652 as indicated by view icon 686.

User Control Features

The present embodiment of the invention operates within the Windows™ operating system of Microsoft Corporation. Within such operating system, a set of menus are available for user implementation. Such menus include a View menu, an Edit menu, an Item menu, a Window menu and a Format menu.

The View menu allows for annotations to be formed for item attachments. Annotations are similar to item descriptions in that they can be up to 255 characters. There are, however, two important differences between annotations and item descriptions. First, attachment annotations are not displayed by default. Second, attachment annotations are maintained with the attached file. Thus, annotations are exposed to all users, not just other users sharing the same board. The "Columns" command of the View menu allows for the display of the attachment annotation column of the view. Once the annotation column is displayed, a user can simply click a mouse pointer upon it and thereafter type the description for the corresponding attachment.

The View menu also provides a user with a number of options when synchronizing an unread piece of information. Such options are later discussed in detail.

Within the Edit menu of the present invention, a variety of commands exist for the manipulation of text found within an item. Text is edited by employing commands such as "Cut Text", "Delete Text" and "Paste Text". These commands operate in identical fashion to the commands found in applications operated within the Windows™ environment of Microsoft Corporation.

The Edit menu can also be employed to edit items themselves. This is accomplished by clicking a mouse pointer upon either the "view icon" or the "item icon" box. The Edit menu contents will then change to reflect the new mode. Upon selection of an item, the "Cut item" command clears the clipboard and places the current item on it whereas the "Append Item" command adds the current item to the clipboard. Thereafter, the "Paste Clipboard" command places all of the clipboard items into the current view. Furthermore, the "Delete Item" command permanently removes an item or view.

Within the Item Menu of the present invention, note files can be created by clicking a mouse pointer upon the note field of an item, or by using the "Attach Note" command from the Item menu. Similarly, note files can be removed by using the "Remove Note" command from the item menu. Selection of the "Attach Note" command causes the present invention to present a simple note editor which allows the user to create, cut, copy, and paste text. The text of the item note may be saved before or upon termination of a user session so as to retain the text within the created item. Item notes can not, however, exceed 32,767 characters.

The Window menu offers a variety of navigation options. First, the "Cascade" command stacks the active windows from the upper left. Second, the "Close Window" command closes the current window with the exception of a root view. Third, the "Close All Windows" command clears the selecting desktop of all views except for the root view. Below the standard commands is a list of active views. Selecting any one of these active views will produce the selected active view at the forefront of the display interface.

The present invention provides for modification of the font or color of he display interface through the Format menu. The font command of the Format menu allows a user to change the typeface, special effects and size of the font within the current view. The color command of the Format menu presents a dialog box which allows a user to change certain colors associated with the current view.

The Columns menu may be utilized to select which columns are to be displayed within the current view by placing a check next to the column. Selected columns are thereafter displayed. The remainder of the listed columns are hidden. Certain columns which are turned off by default, can be reinstated through the Columns menu. A view can thereafter be set back to the system default by choosing the "Reset to Column Defaults" command.

Figure 7:
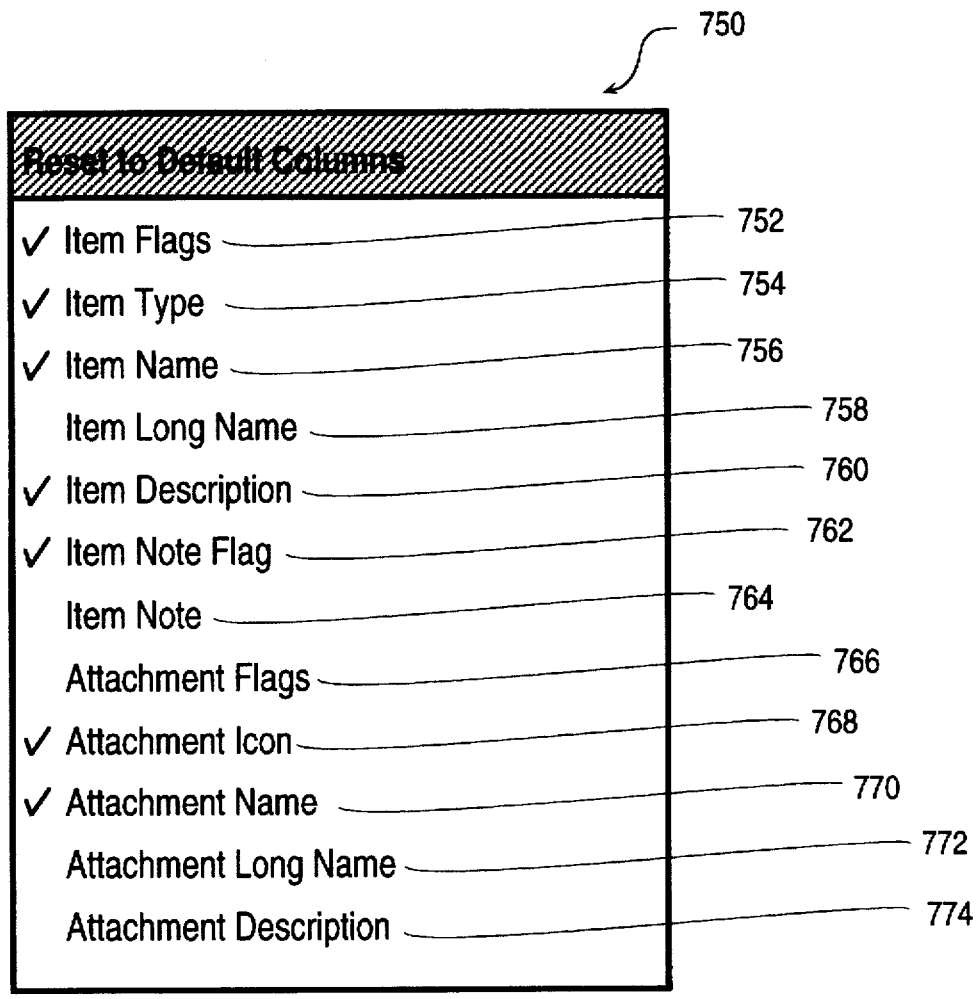
FIG. 7 illustrates a column selection window in accordance with the present invention.

Referring to FIG. 7, a column selection window is illustrated. Column selection window 750 contains a listing of potential columns of information that may be displayed for a given view. In particular, such listing contains column selections for: (i) item flags, (ii) item type, (iii) item name, (iv) item long name, (v) item description, (vi) item note flag, (vii) item note, (viii) attachment flags, (ix) attachment icon, (x) attachment name, (xi) attachment long name, and (xii) attachment description. Those column selections are referred to with reference numerals 752, 754, 756, 758, 760, 762, 764, 766, 768, 770, 772 and 774, respectively. Column selections are implemented by placing a check or removing a check from each column selection. FIG. 7 thus indicates that only column selections 752, 754, 756, 760, 762, 768 and 770 have been implemented for display.

In addition to the columns of a view, display characteristics of a view can be modified. Parameters such as the typeface, size, fields/columns displayed and sorting may all be modified. None of these options alters, however, the contents of the view itself. Formerly specified user options are available upon the opening of a view without further specification.

The present invention provides a wide variety of ways to sort data, corresponding to the ways in which a user may use different views. To sort a view by the status of an item, the Format menu is employed.

Items may be sorted (i) alphabetically by name, (ii) by status, (iii) with unread items first, (iv) by date, or (v) by attachment name. The first manner of sorting items is by name wherein uppercase letters will sort before lowercase letters.

The second manner of sorting items requires assigning one of the following five status indications to each item: (i) "critical", (ii) "in process", (iii) "okay", (iv) "postponed", or a (v) default status of "clear". First, the status indication of "clear" is the default. It is indicated to the user by an item type icon that is colored black. Second, the status indication of "okay" is employed for items which are completed or on schedule. Such items are indicated by an item type icon that is colored green. Third, the status indication of "in process" is employed for items which are in progress or which the user has set aside to work on at a later time. Such items are indicated by a yellow item type icon. Fourth, the status indication of "critical" is used to denote items which require specific attention or are behind in schedule. Such items are indicated by a red colored item type icon. Fifth, the status indication of "postponed" is used for items which are not under active consideration.

Items are thereafter sorted within the item listing according to their status indication. Accordingly, items having a critical status appear at the top of the listing followed by items having an "in process" status. Items having status's of "okay", "postponed" and those items with the default status of "clear" are thereafter listed, respectively.

The third manner of sorting items is to sort all of the items which have not been read to the top of the listing. After the items have been read, they, may be marked and resorted according to another manner. The fourth manner of sorting items is by the date of most recent modification. Accordingly, the most recent items will move to the top of the view. The final manner of sorting is alphabetically by attachment name.

The present invention also provides diverse tools by which the user may interact with the present invention. These tools provide the user with alternative ways of accessing certain functionality, displays of additional information, or production of additional functionality. As such, these tools allow for the user to better operate within the present invention.

Tools existing within the present invention include: (i) an item browser which allows for a precursory examination of information within a given view; (ii) a launch view that establishes a view upon the occurrence of a specified event or time; (iii) an attachment launch menu which establishes provides an attachment upon the occurrence of a specified event or time; and, (iv) a user preferences dialog box which contains specified modification selections.

An item browser dialog box allows a user to review the modifications that have been made to a particular item. The present invention allows for creation of a launch view. Creation of a launch view provides for a floating window with an icon of all the documents and applications within the current view. Depressing any of the icons will thus open the document or commence the application.

A launch view thus provides the flexibility of a program retrieval system although integrated within the present invention. It provides the user with a documented set of launching icons which the user can employ at any time during a session. Each of the launch settings of a user ire retained within memory of the view wherein it was created. Hence, the launch settings will be retained for subsequent sessions so long as the view wherein it was created is not removed.

Launching of an attached file involves user specification of a time when the attachment will appear. Launch times may be specified with a default current active view. Such a specification allows for macros imbedded within the present invention to support direct file manipulation and OLE interaction with the surrounding items.

Indication of Modifications

Any modifications to an item or view, as well as any items or views which have not been read, are recorded and indicated as such to the user. This allows each user to ascertain who has last modified all or part of any information in an item, and the time of modification. Using color codes and picture overlays, the present invention points out modified items and views to a user. Thus, a user of the present invention can quickly browse through any information and search out unreviewed items of interest.

There are four different kinds of modifications which are sought out and presented as unread. In particular, a modification is deemed to occur when: (i) the name or description of an item has changed since it was last read or if the item is entirely new to the user; (ii) the note file is changed since it was last read; (iii) the content or name of the attached file has changed; and (iv) the underlying view is changed in some fashion.

In the event that the name or description of an item has changed, the user is alerted by the present invention. In particular, the item type icon will be highlighted and the name and description of the item will be colored red.

When a note to an item has been changed since it was last read, the present invention will highlight the note file icon. In addition, the note icon will be overlaid by with the notation of "NEW".

If the attached file has changed, that is if the attachment has a different date or time or has been removed altogether, the present invention will highlight the name of the attached file. A red colored highlighting denotes a change. However, a magenta colored highlighting denotes that the file no longer exists within the specified location. More specific information can be acquired by double-clicking a mouse pointer upon the attachment name. Alternatively, such information may be acquired by accessing the item browser mechanism described below.

When a modification has been made within the underlying view, the present invention marks the view icon with a red highlight. A view can be synchronized, that is removed of the notation of "NEW", from the View menu. However, in order to observe what has been modified the view must be opened. Highlights can be changed and items or views can be synchronized in one of several ways. The View menu provides the user with the option of (i) synchronizing the current view by the command "mark current view as read"; (ii) synchronizing a selected view by the command "mark selected view as read"; or (iii) synchronizing a selected view and its sub-views by the command "mark selected view and sub-views as read".

The editing of an item name or item description causes the item highlights to be cleared from the display interface. Similarly, editing of an item note or attachment results in the removal of highlights. An attachment may be synchronized by clicking the mouse pointer upon it to bring up the attachment dialog box. The attachment dialog box will then display information concerning the attachment, display the current state of the attached file, as well as provide the user with an opportunity to synchronize the attachment.

In addition to the default indications of item status, the present invention presents a user with the option of reviewing additional information about the current item. The "Get Item Information" command from the Item menu initiates an item browser window. The item browser window allows a user to observe detailed information concerning the current item. Such information includes the person who last modified each part of the item and the time of modification.

The item browser window, provides a user with further information about the modification history of a particular item. The item browser window remains at the forefront of the display interface for its duration of use. Further, the item browser window will update itself to reflect the currently selected item.

Figure 8:
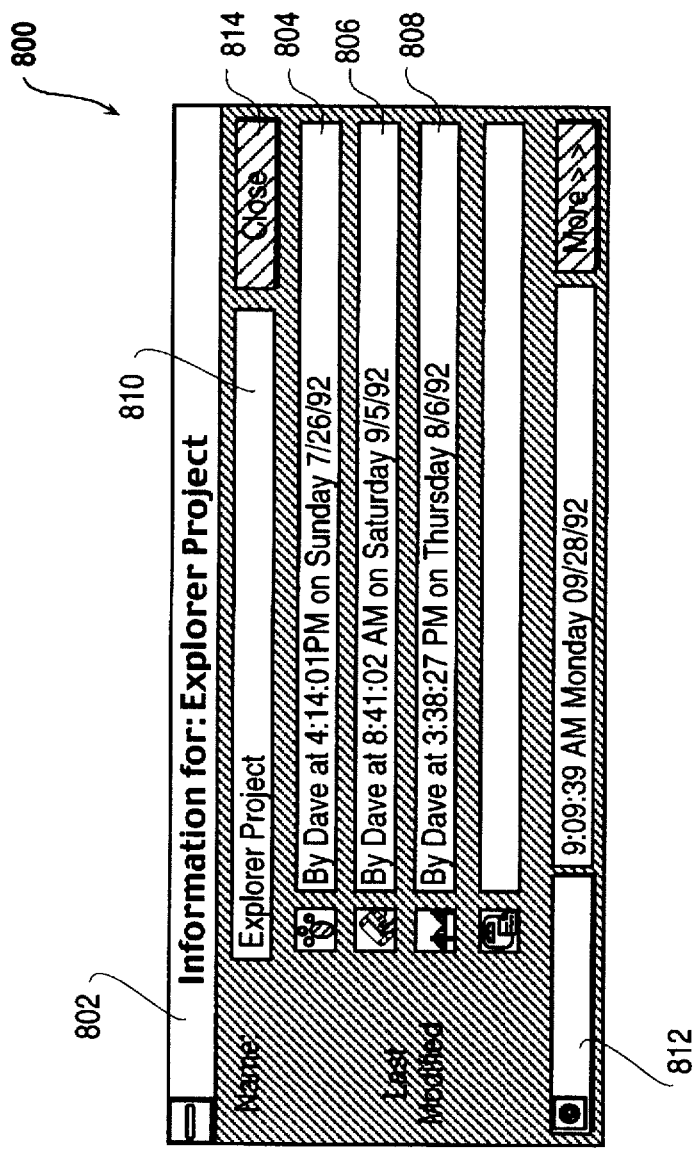
FIG. 8 illustrates an item browser window in accordance with the present invention.

Referring to FIG. 8, an item browser window is illustrated. Item browser window 800 contains information for an item termed "Explorer Project" as indicated by title bar 802. This is implemented after text box 810 is filled with the item name of "Explorer Project." Item browser window 800 thus provides information regarding the last modifications of the "Explorer Project" item. Such information is indicated by reference numerals 804, 806, and 808, respectively.

The item browser window allows a user to mark an item as read, that is synchronize an item, by synchronize button 812. When the item needs updating, synchronize button 812 is colored red. Otherwise, synchronize button 812 is colored green. Consequently, once an item is marked as having been read, the item will no longer have a notation of "NEW" unless additional modifications are made. Upon termination of usage of the item browser window, close button 814 is depressed.

Since it can become a time consuming task to mark each item as read when there are large numbers of changes, the present invention permits a user to simultaneously mark an entire set of items within view as read from the View menu.

ARCHITECTURE OF THE PREFERRED EMBODIMENT

The preferred embodiment employs an architecture which maintains distinct data structures and display characteristics through the use of object-oriented techniques. Such architecture can be implemented on diverse host systems including differing data storage mechanisms, windowing environments, network systems and operating systems. Moreover, the present invention may employ either a file system or a data base for purposes of underlying storage.

The architecture of the preferred embodiment is organized into three critical hierarchies. First, there exists an object class hierarchy wherein objects are organized so as to facilitate interchange ability of operations and portability across different specific implementations. Second, there exists a storage hierarchy which comprises the boards and their information contents. Third, there exists a display hierarchy which provides a means through which users may view and interact with the storage hierarchy.

Figure 9:
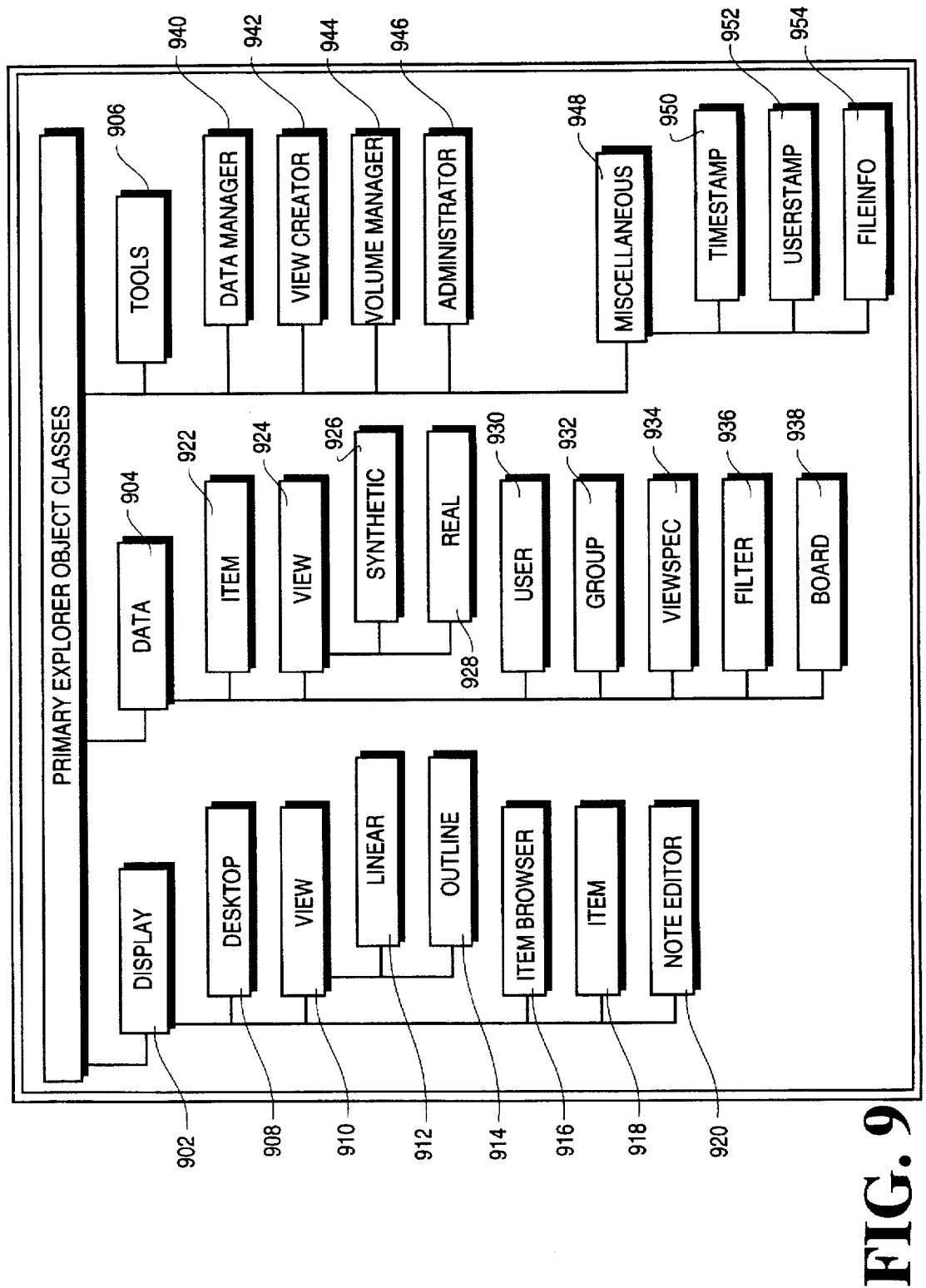
FIG. 9 illustrates an object class hierarchy in accordance with the present invention.

Referring to FIG. 9, an object class hierarchy is illustrated. The present invention comprises the three primary object classes of display class 902, data class 904 and tools class 906. Display class 902 is first decomposed into desktop class 908 which is in turn decomposed into view class 910. View class 910 possesses both a linear class 912 and an outline class 914. Furthermore, view class 910 is decomposed into an item browser class, a item class and a note editor class. Such object classes are referred to with reference numerals 916, 918 and 920, respectively.

Data class 904, the second primary object class, is decomposed into item class 922. Item class 922 is entirely included within view class 924. View class 924 is decomposed into a synthetic and real class which are referred to by reference numerals 926 and 928, respectively. Item class 922 is further decomposed into to a user class, a group class, a viewspec class, a filter class and a board class. Such classes are referred to with reference numerals 930, 932, 934, 936 and 938, respectively.

Tool class 906, the third primary object class, is decomposed into five respective object classes. The five respective object classes are as follows: the data manager class, the view creator class, the volume manager class, the administrator class, and the miscellaneous class. Such classes are referred to with reference numbers 940, 942, 944, 946 and 948, respectively. Miscellaneous class 948 contains three further classes which each possess information regarding an item. The contained classes relate to the files entitled TimeStamp, UserStamp and FileInfo.

The highest level object class for a given user display is desktop class 908. This class is physically defined by the area of the application window. Within the desktop are views of one or more data objects. The information contained within the desktop may be saved on demand. The default condition also saves most information contained within the desktop upon exit so that it is available for a subsequent session. Such information includes session commencement information as well as specific views, contents, and view preferences. More than one desktop configuration may be saved wherein each desktop configuration represents a distinct assembly of views or refers to a different board. Accordingly, views of a data object are all equivalently considered to be "children" of the desktop to which they correspond.

Within each view of a data object are specific displays for individual items associated with the data object being viewed. Each display provides a substantial amount of information about an item. A user, however, can choose to only display a subset of that information. This is accomplished by utilization of the Column menu which possesses commands for item display.

The preferred embodiment provides a hierarchical organization of the data contained within a given board. Specifically, a board is implemented within a file system directory tree. A board can, however, also be implemented within a database. Individual views are implemented as sub-directories from either the parent board directory or the corresponding sub-directories which belong to their parent views.

Thus, the board acts as a "parent" view for all of its sub-views and items. Currently, all of the data for a given board is stored within files which designate the given board in the file system. Item data files, view data files and user data files are all stored files designated by the suffix ".DA". In contrast, views are contained within directories having the suffix designation of ".PRJ". This allows for underlying items to be data files within those directories.

To facilitate the mapping of item and view names, the preferred embodiment maps long names to unique names in the underlying file system. The preferred embodiment employs an implementation which uses the first three characters from the name, with a notation of "~" substituted for unrecognizable characters, and a three digit number sequence appended to prevent conflicting mapped names.

Figure 10:
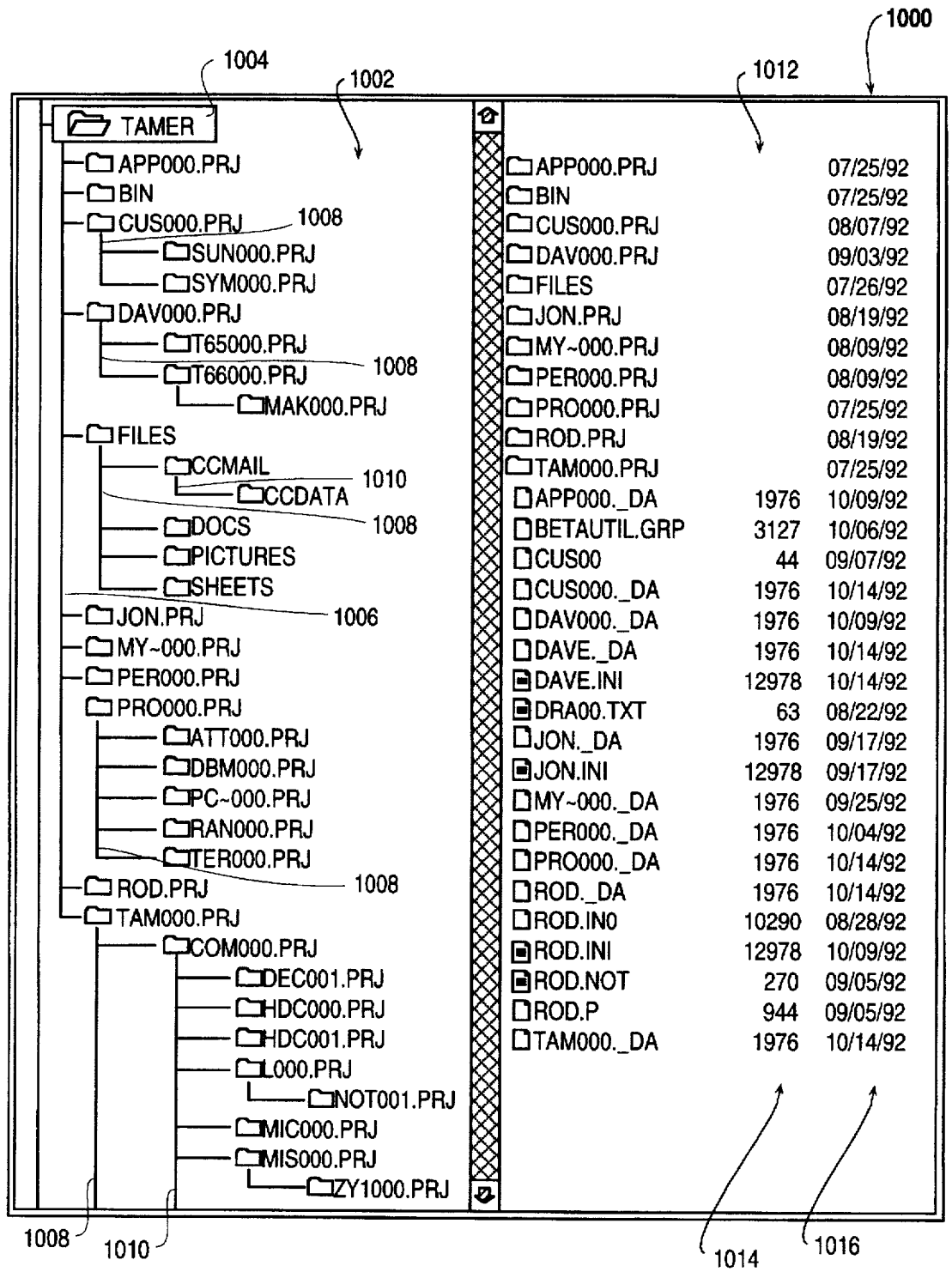
FIG. 10 illustrates a typical file system for a board in accordance with the present invention.

Referring to FIG. 10, a typical file system for a board is illustrated. Box 1002 of window 1000 contains the directory tree for a board entitled TAMER as indicated by reference numeral 1004. Board 1004 is primary branch 1006. Primary branch 1006 points to the set of views for board 1006. Secondary branches 1008 thus extend from views to designate sub-views. Further, tertiary branches 1010 extend from sub-views to the one or more items contained within a given sub-view. Box 1012 of window 1000 contains a listing of long names for views referred to within box 1002 as well as other supporting data files. Box 1012 also contains columns 1014 and 1016 which respectively indicate the number of bytes and data of a corresponding name file.

The hierarchy described herein provides the user with a manner of navigating and forming a query to the board. It is assumed that related topics will be grouped together into views, and that related views will in turn be grouped into parent views. A user can thus traverse a directory tree from the root view, through various layers of parent views, to the specific item or view in which they are interested. In addition, the structure of the hierarchy allows for information about synchronization and marking to be passed up through the data hierarchy. Hence, an indicator of a change on a view signals that either the view or one of its sub-views have changed since last marked.

Two primary data structures are employed for recording items collected into a particular view. The first primary data structure is the view structure. The view structure contains the data saved as part of the item, which is permanently persistent as part of the item. The second primary data structure is the ViewInfo structure. The ViewInfo structure is specific to particular preferences and displays. Such structure is not stored within an item or view. Rather, it is stored along with the preferences of the user for a specific board. This allows for utilization of the data structure at run-time as well as permits display retention of the data across invocations.

The view structure contains information concerning the creation of the view such as pattern and attributes. The view structure also possesses information concerning: (i) storage information such as the path of the view; (ii) the manner of display of the view upon default which is contained within fields entitled "ColShow", "ColWidths" and "SortType"; and (iii) the determination of newly formed or "unmarked" items as contained within fields entitled "UpDateType", "UpDateInterval" and "UpDateTime".

A data base referred to as "ViewArray" is maintained to retain information which is dynamically maintained during a user session. Data base ViewArray is composed of data elements of a type corresponding to the ViewInfo structure. Such information is saved upon termination of a session on the basis of the user and board which were utilized during the session. The information contained within the data base ViewArray includes: (i) the internal notion of the view such as version number, location, file name, and view name; (ii) whether the view is in a used or inactive state with respect to the display; (iii) accurate display information for the view; and, (iv) a link to the more persistent view related to the dynamic view which is contained within a data base entitled ViewStuff.

In addition, the preferred embodiment stores user preferences within a system directory in a file named "EXPLORER.INI". These user specified preferences are retained from session to session as a convenience to a user. The preferred embodiment establishes an .INI file for a user upon interaction with a board. The .INI file is in a binary format, and is comprised of an array of ViewInfo data structures. The .INI file is thereafter read into memory upon commencement of a session. The EXPLORER.INI file is kept in a standard system format. In addition, there is also a set of settings referred to by the names "<Username> INI". Such settings are formed for each user and stored with each board the user has accessed.

When a new item is created, it is immediately assigned to the current or another specified view. Preferably, an item can only be contained within one "real view" for purposes of simplicity. An item may be contained, however, within an unlimited number of synthetic views. Real views are those views which are implemented through the directory tree or any suitable data base or data storage system. In contrast, synthetic views are assembled from the contents of multiple real views for the purpose of allowing the user to have a more flexible way to organize on a variety of information.

Modification of sub-views or items within a displayed view immediately affects the underlying storage for the view or item. The preferred embodiment provides for direct editing of the item name and description. When a user departs from an edited field, the edited field is immediately updated within the storage. Consequently, a subsequently opened view will possess the data modifications for the edited item name or description.

Preferably, five types of stamps are utilized within the preferred embodiment as follows. First, ItemStamps are used to retain the name of the user who last modified an item as well as the system time of such modification. Second, UserStamps are composite objects composed of a user name, a system time and a set of routines which can set and check the ItemStamp to verify whether another user has modified a file. Third, FileStamps are an independent operating system object which stamps the system time of an external file so as to allow for a determination of whether modifications have occurred within the external file. Fourth, NoteStamps are maintained by the preferred embodiment to record changes within an item note. Fifth, AttachStamps are maintained by the preferred embodiment to denote the system time of synchronization of an attachment.

Attachments are contained as external objects within underlying file system or database. Specifically, the preferred embodiment possesses a FileInfo structure for each attachment. The FileInfo structure contains a pointer to an external file or object as well as a local variable time referred herein as the FileInfo time. The FileInfo time being the system time of the last modification of the attachment. The FileInfo structure may also include an annotation file which is maintained with the external file. One or more attachments may be appended to an item. Attachments such as OLE tooltalk links, multi-media objects, or multiple attachments may also be appended. Such attachments are treated in a similar fashion as other attachments, except that updating routines are analyzed for changes in a manner appropriate to the specific object. Further, multiple attachments can be maintained by providing additional data elements of the same form as those used to record the existing attachment.

The preferred embodiment further possesses an AttachInfo structure having a AttachInfo time. Such AttachInfo time denoting the FileInfo time of the FileInfo structure during the previous run of the system. Hence, comparison of the AttachInfo with the FileInfo time allows for a change in the FileInfo time to be detected.

A user may modify the contents of an attachment from within the preferred embodiment or outside of the preferred embodiment. In the event that the external file is modified from within the preferred embodiment, the ItemStamp, UserStamp and AttachStamp are altered. In the event that the external file is modified outside of the preferred embodiment, the preferred embodiment can still record the modifications. In particular, the preferred embodiment can detect modifications such as creation of a file, modification of file content, replacement of a file and deletion of a file. Modifications are recorded separately for each user so as to allow for user specific displays. User specific modifications can be recorded with respect to multiple elements of an item without maintaining user specific information for each piece of the item.

Utilization of the system time for each of the five aforementioned stamps assumes that each workstation which employs the preferred embodiment maintains a system time that is consistent with all other workstations. If no synchronized time source exists with respect to all workstations, sequence numbers may be alternatively utilized. That is, a sequence number is maintained by each stamp or structure in a 16-bit long integer field which commences at 1. An appropriate sequence number is incremented whenever the system time of a stamp or structure is to be updated. This allows for two sequence numbers, such as those corresponding to a UserStamp and AttachStamp, to be compared for purposes of determining which is more recent.

Synchronization of Modifications

While the same item can be shared by multiple users of a given board subject to a permission, each user has their own subjective perspective of the state of an item. This individual perspective, also referred to as a notion, is maintained by the preferred embodiment.

Synchronization refers to a process by which a user reconciles modifications to stored information. Modificiations of information are checked for in a variety of ways since modifications can transpire at various points in time. For instance, modifications can be discovered at each of the following times: the passage of a specified period of time, the opening of a view or sub-view containing an item, or by another appropriate action.

Items can be either non-synchronized ("new"), or synchronized ("marked" or "read"). The synchronization of each item with respect to a particular user depends upon the following pieces of data: (i) the time the user last marked the item, or caused it to be marked, which is contained within the UserStamp; (ii) the time at which item specific information which includes an item name, item description or item note, was last modified as indicated by the ItemStamp; (iii) the time at which an item name was last modified as indicated by the NoteStamp; (iv) the time at which an existing attachment name was last specified, which is indicated within the AttachStamp as well as the ItemStamp; (v) the time at which the user last marked an existing attachment as being current, which is contained within the UserStamp; (vi) the last modified date of an existing attachment where a non-existing attachment file is assumed to be "0" or any other illegal date that is used consistently, as indicated by the FileInfo time; (vii) the last previous FileInfo time as indicated by the AttachInfo time; and (viii) whether changes have occurred to any items or sub-views within a view which is the item for which status is being determined. In addition to being contained within stamps, each of the aforementioned pieces of data can alternatively be maintained by sequence numbers.

The preferred embodiment determines if an item is non-synchronized by analyzing the aforementioned pieces of data. With the exception of attachment related modification, an item of a particular user is determined to be current when each of the modification times precede the marked time of the particular user. Thus, if any of the update times come later with respect to the marked time of the particular user and are caused by another user or the system, then the item is identified as "NEW" and appropriate display behavior initiated.

Any editing of the name, description, item note, status, or any other item specific information is recorded both in the form of the edit itself as well as an update to the ItemStamp of the item and the UserStamp corresponding to the editing user. The ItemStamp is updated to reflect that the editing user is the most recent user to have caused a change to the item specific info. The update entails placing the appropriate user name into the name field of the ItemStamp. In addition, the current system time is recorded within the ItemStamp for comparison with UserStamp times. Similarly, stamps for specific portions of the item, such as the NoteStamp and AttachStamp, are updated when a change is made to an item note and an attachment, respectively.

As necessary, the preferred embodiment undertakes a search for unread information. An immediate search for unread information will reveal that the modification of the current user occurred after the item marking every other user. That is, the UserStamp of each user precedes the newly updated ItemStamp. This causes all future displays of the item for other users to be reflected as unread as evidenced by a "NEW" notation. The item will continue to be deemed unread for a given user until that user elects to mark the item as read. When a user elects to mark the item as read, the UserStamp of the current user is updated to the system time of marking. This causes a subsequent search for unread information to fail with respect to the current user, and thereby reverts the item to its normal state. Thus, searches for unread information are carried out with respect to each individual user to produce user specific results.

In the event that a modification to item specific information was made by the current user, the preferred embodiment updates the UserStamp of the current user only after the ItemStamp is updated. Updating the ItemStamp before the UserStamp causes a subsequent search for unread information to conclude that the information is not. Accordingly, no notation of "NEW" information is applied to the item.

If the contents of an item note are modified from within the preferred embodiment, the procedure undertaken for the editing of item specific information is followed. The only exception being that the NoteStamp is modified in addition to modification of the ItemStamp and UserStamp.

There is a separate determination which takes place with respect to an attachment related modification. The above determination of non-synchronized items is inappropriate for attachment related purposes. This is because each attachment resides outside the preferred embodiment and is utilized within a multi-user environment.

Some current systems identify "NEW" attached objects by comparing the time of last modification to the date of the last reading or marking of a user. The attachment is thus declared to be "NEW" if the modification is more recent than the marking. Such a system of identifying unread material has serious shortcomings. Namely, such systems prove to be inaccurate when: (i) an external file or object is deleted in which case the comparison is invalid or misleading; and (ii) when the external file or object is replaced by an older file or object in which case the system does not notice a change and incorrectly reports that nothing has been modified.

The preferred embodiment overcomes the aforementioned shortcomings by comparing the current FileInfo time of an attachment, which is the system time denoting the last modification to the attachment, with the previous FileInfo time (the AttachInfo time). When the two times are compared and found to be unequal, the attachment is deemed to be non-synchronized for all users. If the two times are equal, however, a user specific determination is undertaken. The following pseudo code details such a procedure:

```
If Item.Attachment.Name
Then
    If FileExits(Item.AttachmentName)
    Then
        FileInfo = FileDateAndTime(Item.AttachmentName)
    Else
        FileInfo = 0
        MarkItem.Attachment As "No longer exists"
    End If
    If FileInfo NotEqualTo Item.AttachmentInfo
    Then
        Mark Item.Attachment As New
        Set Item.AttachmentInfo = FileInfo
        Set Item.AttachmentStamp.Time = CurrentTimeAndDate
    Else
        If Item.UserStamp.Time IsOlderThan Item.Attachment Stamp.Time
        Then
            Mark Item.Attachment As New
        End If
    End If
End If
```

Referring to FIG. 11, a flow chart depicting the procedures for determining whether non-synchronized subject matter is contained within an attachment is illustrated.

A determination of whether an item having an attachment is synchronized, as referred to with numeral 1102, initially requires a determination of whether an attached file exists within its designated external location. This is indicated by block 1104. In the event that an attached file exists within its designated external location, a FileInfo time is determined which reflects the system time when the attachment was last modified. This is denoted by block 1108. In the event that no attached file exists, a FileInfo time of zero is rendered. This is denoted by block 1106. Thereafter, a determination is made as to whether the FileInfo time is unequal to the AttachInfo time as indicated by block 1110.

If the determined FileStamp time is unequal to the AttachInfo time, the item is deemed non-synchronized with respect to all users as indicated by block 1112. Moreover, if the FileInfo time is less than the AttachInfo time, then the preferred embodiment will recognize that an earlier version of the attachment now exists under the attachment name.

When the FileInfo and AttachInfo times are determined to be unequal, two changes occur. First, the AttachStamp time of the item is set to the current system time. That is, set the AttachStamp time to the time when the AttachInfo time is equated with the FileInfo time. This is indicated by box 1120. By equating the two times, subsequent synchronization determinations will reach the further determination of block 1116 (with a newly set AttachStamp time) until a subsequent change in the FileInfo time. This is indicated by box 1122.

If the FileInfo time with respect to all users is equivalent to the AttachInfo time, however, a further determination with respect to each given user is necessary. As indicated by block 1116, the further determination compares the UserStamp time of a given user with the AttachStamp time of the given user. That is, the time at which the user last indicated that the attachment was last synchronized (marked as read) is compared with the time at which the attachment was last noticed as changed. If the UserStamp time of the given user precedes the AttachStamp time of the given user then the item is deemed non-synchronized with respect to the given user as indicated by block 1118. Otherwise, the item is deemed to be synchronized with respect to the given user as indicated by block 1114.

For instance, assume that version 3 of a document resided under a given attachment name having a FileInfo time of Tuesday (time it was last modified). Thereafter, version 3 of the document is changed to a former version, version 1, wherein version 1 is noted as having been last modified on Monday. The FileInfo time is now Monday whereas the AttachInfo time becomes Tuesday since Tuesday was the last previous FileInfo time. Upon the subsequent synchronization of the attachment, which occurs on Wednesday, the preferred embodiment will notice that the FileInfo and AttachInfo times are unequal. This will thus cause the item to be deemed non-synchronized for all users. In addition, the AttachStamp is set to the current system time which is Wednesday. Also, the AttachInfo time is equated with the FileInfo time. Thus, both times will be Monday. Thereafter, all synchronization will be user specific. The attachment will only be deemed to be synchronized with respect to a given user when the item is marked subsequent to Wednesday. That is, when the UserStamp time of a given user is later with respect to the newly set AttachStamp time. Such analysis enables the preferred embodiment to accurately report when an alteration of an item has taken place.

As mentioned previously, the utilization of sequence numbers overcomes the problem of having two workstations with different system times. Accordingly, sequence numbers can be employed in place of stamps when determining whether an attachment has been synchronized. For instance, workstation A is set to 9:00 A.M. while workstation B is contemporaneously set to 8:00 A.M. If an attachment is read upon workstation A at 9:00 A.M. and thereafter a modification is made to the attachment upon workstation B at 8:15 A.M. (which is 9:15 A.M. with respect to workstation A), workstation A will wrongly conclude that the modification upon workstation B took place before the reading of the attachment. Thus, the user of workstation A is not alerted to the later modification that occurred upon workstation B.

By utilizing sequence numbers, the reading of the attachment upon workstation A would have been numbered sequence 1. The later modification of the attachment upon workstation B would have been given a sequence number of 2. Thus, workstation A would correctly conclude that the modification of the attachment upon workstation B took place subsequently to the reading that occurred upon workstation A.

Several clear advantages result from the aforementioned manner of determining whether an attachment is synchronized. First, a user specific notion of whether an attachment has been newly modified can be achieved without retaining information with respect to each individual user. Second, users are notified about attachments that have become older with respect to previously read versions. Third, users are notified of the absence of an external file or object under the attachment name while item information concerning the previously existing attachment, such as a note and annotation, are retained. Fourth, users can change an attachment state from a non-existing state to an existing wherein a user will be notified if an attachment reemerges under the attachment name. Thus, the preferred embodiment records the occurrence of a non-existing item until the item is recreated or reappears under the attachment name.

While the invention has been described in terms of a preferred embodiment in a specific system environment, those skilled in the art recognize that the invention can be practiced, with modification, in other and different hardware and software environments within the spirit and scope of the appended claims.

Having thus described our invention, what we claim as new, and desire to secure by letters patent is:

1. A method for managing information in a computer memory and a display, the method comprising the steps of:

(a) forming a plurality of items in the memory, each item having a description corresponding to an article of stored information, said forming step being performed independently of a tool used for creating said article of stored information;

(b) detecting a change relating to the article of stored information, said detecting step being performed independently of a tool used for changing said article of stored information and independently of an explicit request for notification of the change; and (c) indicating the detected change on the display.

2. The method as recited in claim 1, including the step of detecting if a user is authorized to make a change.

3. The method as recited in claim 2, including the steps of:

(a) recording a time in the memory of the computer when a particular item is marked by the authorized user;

(b) recording a time in the memory of the computer when the particular item was last changed; and (c) detecting when the time of marking precedes the time of last alteration.

4. The method as recited in claim 3, wherein said recording and detecting steps are performed automatically without user interaction.

5. The method as recited in claim 2, including the steps of:

(a) recording a first sequence number when a particular item is marked by the authorized user;

(c) recording a later sequence number when the particular item is altered; and (b) detecting a change with respect to the authorized user when the later sequence number is recorded.

6. The method as recited in claim 1, wherein the article of information is an attached external file or an object.

7. The method as recited in claim 6, wherein the external file or object is attached by directing a pointer to the external file or object.

8. The method as recited in claim 6, including the step of accessing the external file or object.

9. The method as recited in claim 1, wherein the detected change is indicated with respect to the item which relates to the detected change.

10. The method as recited in claim 1, including the step of placing each of the plurality of items in at least one view.

11. The method as recited in claim 10, wherein the detected change is indicated with respect to the view where the item which relates to the detected change is placed.

12. The method as recited in claim 10 wherein the step of placing each of the plurality of items in at least one view occurs automatically without user interaction.

13. The method as recited in claim 1, wherein the article of information is an external file or an object located on a remote node of a computer network.

14. The method as recited in claim 1 wherein the detecting step further comprises the steps of:

comparing a previously recorded stamp corresponding to the article of stored information with a current stamp corresponding to said article of stored information.

15. The method as recited in claim 14 wherein said stamps include at least one of the following: item, user, file, note or attach stamp.

16. A method for detecting a user specific change in a computer with a memory and a display, the method comprising the steps of:

(a) detecting a change in a last observed external object and a current external object of a designated location, said detecting step being performed independently of a tool used for creating or changing external objects and independently of an explicit request for notification of the change;

(b) indicating the detected change to one or more users on the computer display; and (c) continuing to indicate the detected change to a given user until the given user acknowledges the detected change.

17. The method as recited in claim 16, wherein a change is detected based on a comparison of a time corresponding to the last observed external object and a time corresponding to the current external object.

18. The method as recited in claim 16, wherein a change is detected based on a comparison of a sequence number corresponding to the last observed external object and a sequence number corresponding to the current external object.

19. The method as recited in claim 16, wherein the detected change includes the non-existence of an external object within the designated location.

20. A method for displaying attributes of an article of stored information on a computer display, the method comprising the steps of:

(a) forming a plurality of items, each item having a plurality of attributes corresponding to an article of stored information, said forming step being performed independently of a tool used for creating said article of stored information;

(b) displaying the plurality of attributes of one or more items on the computer display;

(c) detecting a change relating to the article of stored information, said detecting step being performed independently of a tool used for changing the article of stored information and independently of an explicit request for notification of the change; and (d) indicating the detected change through one or more of the plurality attributes of the given item on the computer display.

21. The method as recited in claim 20, wherein one or more of the plurality of attributes denote access to an article of stored information by one or more users.

22. The method as recited in claim 20, wherein one or more of the plurality of attributes describe an article of stored information.

23. The method as recited in claim 20, wherein one or more of the plurality of attributes relate to an external file or object.

24. The method as recited in claim 20, wherein one or more of the plurality of attributes provide access to an external file or object.

25. An apparatus for managing articles of information in a computer with a memory and a display, the apparatus comprising:

(a) processor means for forming a plurality of items, each item having a description and corresponding to an article of stored information, said processor means for forming operating independently of a tool used for creating said article of stored information;

(b) processor means for detecting a change relating to the article of stored information, said processor means for detecting operating independently of a tool used for changing the article of stored information and independently of an explicit request for notification of the change; and (c) display means for indicating the detected change.

26. The apparatus as recited in claim 25, including data base means for forming a plurality of items.

27. The apparatus as recited in claim 25, including a storage device for storing the plurality of items.

28. The apparatus as recited in claim 25, wherein the change is detected with respect to an authorized user.

29. The apparatus as recited in claim 28, including:

(a) means for recording a time when a particular item is marked by the given user;

(c) means for recording a time when the particular item was last altered; and (b) processor means for detecting a change with respect to the authorized user when the later sequence number is recorded.

30. The apparatus as recited in claim 28, including:

(a) means for recording a first sequence number when a particular item is caused to be marked by the given user;

(c) means for recording a later sequence number when the particular item is altered; and (b) processor means for detecting a change with respect to the authorized user when the later sequence number is recorded.

31. The apparatus as recited in claim 25, wherein the article of stored information is an attached external file or an object.

32. The apparatus as recited within claim 31, wherein the external file or object is attached by directing a pointer to the external file or object.

33. The apparatus as recited within claim 31, including a means for accessing the external file or object.

34. The apparatus as recited in claim 25, wherein the detected change is indicated with respect to the item which relates to the detected change.

35. The apparatus as recited in claim 25, including a means for placing each of the plurality of items within at least one view.

36. The apparatus as recited in claim 35, wherein the detected change is indicated with respect to the view where the item which relates to the detected change is placed.

37. The apparatus as recited in claim 25 wherein the means for placing each of the plurality of items within at least one view occurs automatically without user interaction.

38. The apparatus as recited in claim 25 wherein the processor means for detecting further comprises:

processor means for comparing a previously recorded stamp corresponding to the article of stored information with a current stamp corresponding to the article of stored information.

39. The apparatus as recited in claim 38 wherein said stamps include at least one of the following: item, user, file, note, or attach stamp.

40. In a computer with a memory and a display, an apparatus for detecting a user specific change in an external object, the apparatus comprising:

(a) processor means for detecting a change in a last observed external object and a current external object of a designated location, said processor means for detecting operating independently of a tool used for creating or changing external objects and independently of an explicit request for notification of the change;

(b) display means for displaying the detected change to one or more users; and (c) display means for continuing to display the detected change to a given user until the given user acknowledged the detected change.

41. The apparatus as recited in claim 40, wherein a change is detected based on a comparison of a time corresponding to the last observed external object and a time corresponding to the current external object.

42. The apparatus as recited in claim 40, wherein a change is detected based on a comparison of a sequence number corresponding to the last observed external object and a sequence number corresponding to the current external object.

43. The apparatus as recited in claim 40, wherein the detected change includes the non-existence of an external object within a designated location.

44. An apparatus for displaying attributes of an article of stored information on a computer display, the apparatus comprising:
 (a) processor means for forming a plurality of items, each item having a plurality of attributes corresponding to an article of stored information, said processor means for forming operating independently of a tool used for creating said article of stored information;
 (b) display means for displaying the plurality of attributes of one or more items on the computer display;
 (c) processor means for detecting a change relating to the article of stored information, said processor means for detecting operating independently of a tool used for changing the article of stored information and independently of an explicit request for notification of the change;
 (d) display means for indicating the detected change through one or more of the plurality of attributes of the given item on the computer display.

45. The apparatus as recited in claim 44, wherein one or more of the plurality of attributes denote access to an article of stored information by one or more users.

46. The apparatus as recited in claim 44, wherein one or more of the plurality of attributes describe an article of stored information.

47. The apparatus as recited in claim 44, wherein one or more of the plurality of attributes relate to an external file or object.

48. The apparatus as recited in claim 44, wherein one or more of the plurality of attributes provide access to an external file or object.

* * * * *